US005592969A

United States Patent [19]

Reichert

[11] Patent Number: 5,592,969

[45] Date of Patent: Jan. 14, 1997

[54] TURBULENCE ARRESTER

[76] Inventor: Russell L. Reichert, 372 Stokes Rd., Bellville, Tex. 77418

[21] Appl. No.: 401,944

[22] Filed: Mar. 10, 1995

[51] Int. Cl.$^6$ .......... F16K 51/00

[52] U.S. Cl. .......... 137/592; 137/561 A

[58] Field of Search .......... 137/561 A, 592

[56] References Cited

U.S. PATENT DOCUMENTS

| | | | |
|---|---|---|---|
| 1,155,070 | 9/1915 | Kessler | 137/592 |
| 1,157,675 | 10/1915 | Caskey | 137/592 |
| 1,716,692 | 6/1929 | Gundlach | 137/592 |
| 1,824,538 | 9/1931 | Fisher | 137/592 |
| 2,207,057 | 7/1940 | Gulick . | |
| 2,602,465 | 7/1952 | Goehring | 137/592 X |
| 3,045,654 | 7/1962 | Dell | 137/592 |
| 3,244,197 | 4/1966 | Stilwell . | |
| 3,610,538 | 10/1971 | Enders | 137/592 |
| 3,623,505 | 11/1971 | Barsness | 137/592 X |
| 3,993,094 | 11/1976 | Spooner | 137/592 |
| 4,127,143 | 11/1978 | Zinga . | |
| 5,046,529 | 9/1991 | Corella . | |
| 5,095,930 | 3/1992 | Stroszynski et al. | 137/561 A |
| 5,137,053 | 8/1992 | Kale | 137/561 A |

FOREIGN PATENT DOCUMENTS

| | | | |
|---|---|---|---|
| 2703460 | 8/1978 | Germany | 137/592 |

*Primary Examiner*—Edward K. Look
*Assistant Examiner*—Michael S. Lee
*Attorney, Agent, or Firm*—Rosenblatt & Redano, P.C.

[57] ABSTRACT

A turbulence arrester is disclosed which allows fuel delivery at rates equal to or approaching the rates achieved when using an open ended drop tube. The turbulence arrester has a large number of small apertures around its circumferential surface. Fuel flow streams through these apertures contract a short distance from the orifice, then expand and interfere with fuel flow streams from adjacent apertures to generate eddies and turbulence. The turbulence is substantially confined to a narrow region surrounding the turbulence arrester.

11 Claims, 2 Drawing Sheets

TURBULENCE ARRESTER

BACKGROUND OF THE INVENTION

1. Field of the Invention

The present invention relates to underground storage tanks, and particularly to turbulence arresters on drop tubes used to fill underground storage tanks.

2. Background of the Invention

In the United States alone there are approximately five million underground storage tanks used to fuel autos, trucks, planes, etc. Sediment and debris from fuel deliveries or from the tank itself (due to rust, scaling, etc.) accumulate at the bottom of these tanks. Undisturbed, these contaminants would lie on the bottom of the tank and cause no problems. Unfortunately fuel delivery to the tank, which is typically by way of a drop tube installed in the tank, disturbs these contaminants. Therefore fuel filters must be used when dispensing the fuel from the tank. Over time these filters will accumulate deposits of the contaminants and will clog. No fuel can be dispensed from the tank until the filter is changed, an expensive process which disrupts operations for extended periods of time.

Certain fuels, such as diesel, have a tendency to foam during fuel drops. This foam must dissipate before fuel levels in the tank may be accurately read to verify the amount of fuel dropped. Tank owners generally must pay for time spent by delivery persons waiting for the foam to dissipate.

Many underground storage tanks are equipped with continuous in-tank monitors which sound an alarm when water is detected. When water accumulations at the bottom of the tank are disturbed during fuel drops, the alarm may sound unnecessarily.

Known turbulence arresters utilize various arrangements of baffles to slow the fuel's flow velocity as it exits the drop tube. The fuel dispersed into the tank thus produces less turbulence in the fuel already present in the tank and is therefore less likely to disturb contaminants. Such arrangements also impede the delivery of fuel to the tank, thus requiring longer to complete the fuel drop.

SUMMARY OF THE INVENTION

A turbulence arrester is disclosed which allows fuel delivery at rates equal to or approaching the rates achieved when using an open ended drop tube. The turbulence arrester has a large number of small apertures around its circumferential surface. Fuel flow streams through these apertures contract a short distance from the orifice, then expand and interfere with fuel flow streams from adjacent apertures to generate eddies and turbulence. The turbulence is substantially confined to a narrow region surrounding the turbulence arrester.

DETAILED DESCRIPTION OF THE PREFERRED EMBODIMENT

Figure 1:
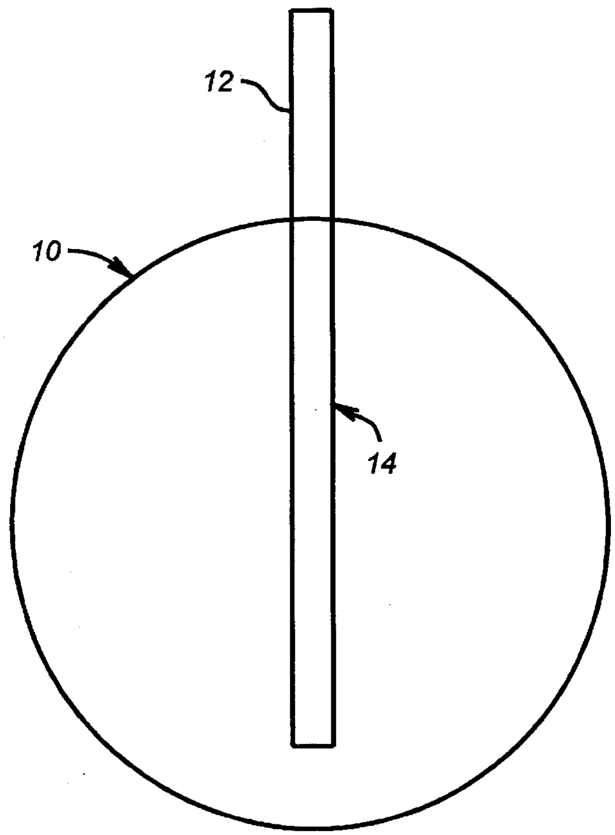
FIG. 1 is an axial view of an underground storage tank.
Figure 2:
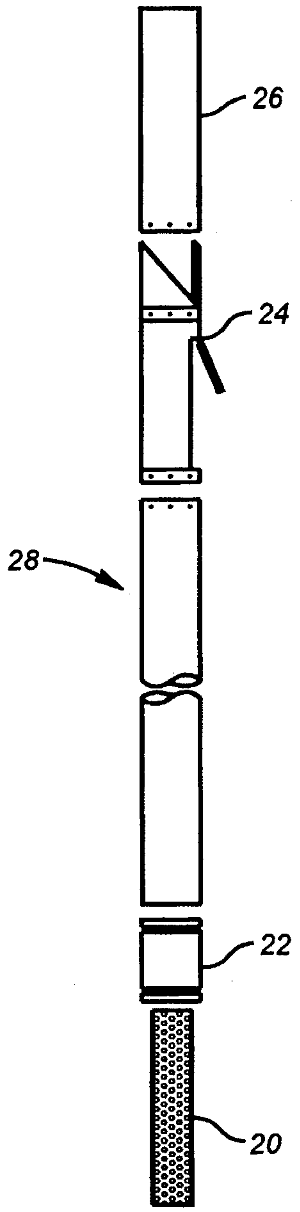
FIG. 2 is a side view of a drop tube fitted with a turbulence arrester according the present invention.
Figure 3A:
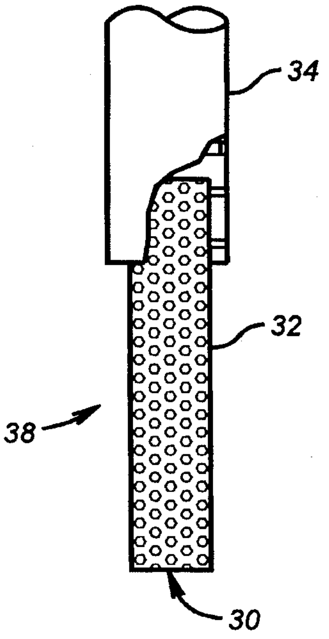
FIGS. 3*a* an 3*b* are detailed side views of the present invention.
Figure 3B:
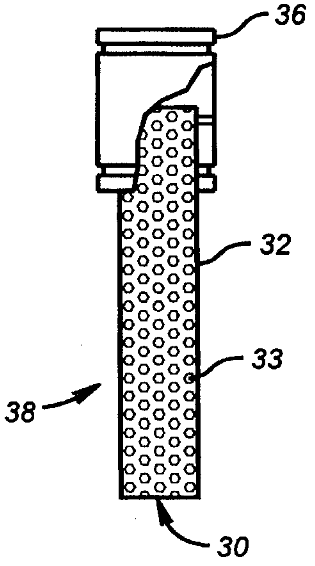
Figure 4:
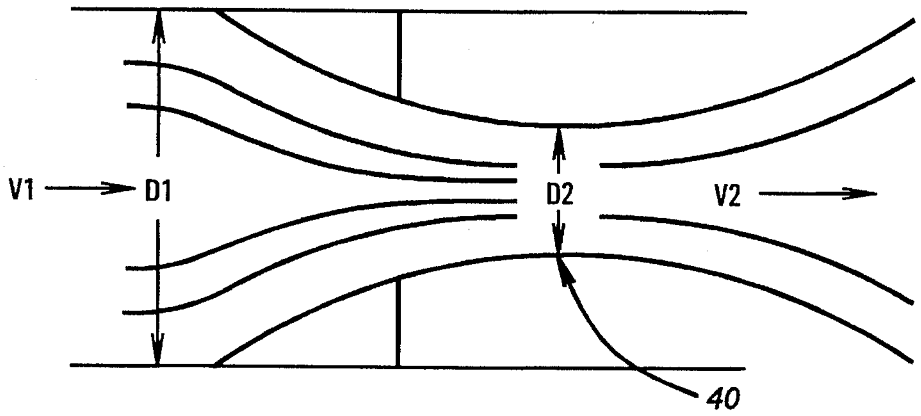
FIG. 4 is a diagram of the pressure in a fluid stream exiting an aperture as a function of distance from the aperture.
Figure 5:
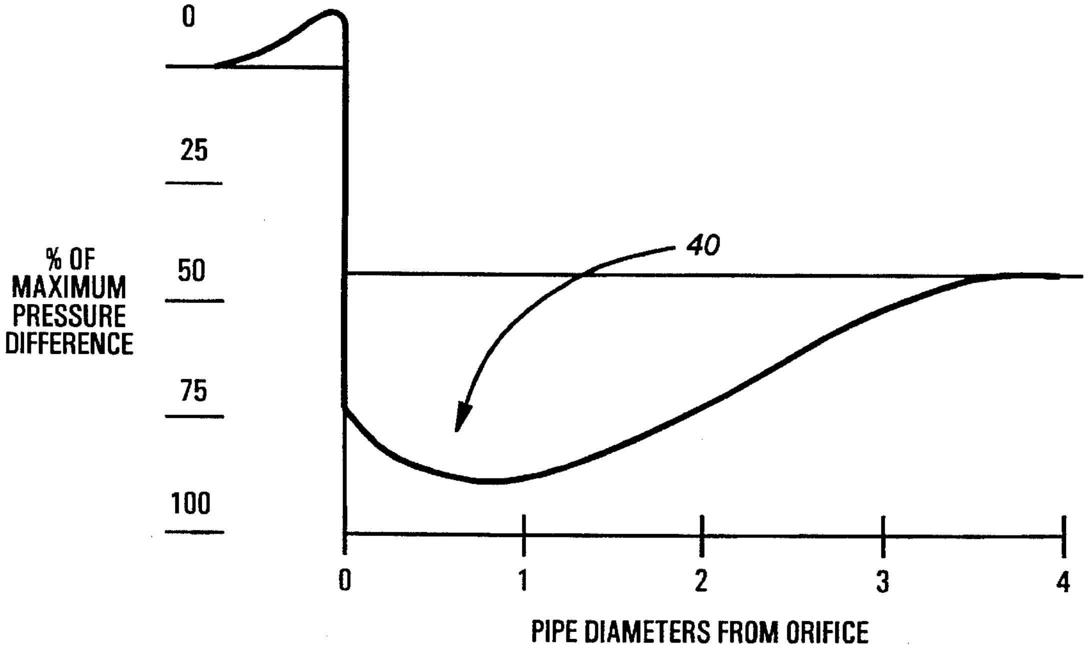
FIG. 5 is a diagram of the contraction experienced by a fluid stream exiting an aperture.
Figure 6:
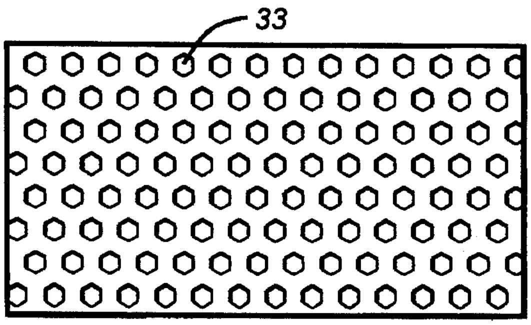
FIG. 6 is an illustration of the arrangement of perforations which may be used with the present invention.

Underground storage tanks 10 are generally equipped with a fill riser 12 and a drop tube 14. The turbulence arrester 20 of the present invention is fitted to the end of the drop tube 28. The turbulence arrester 38 may be fitted directly to drop tube by means of an appropriate adapter 38.

The turbulence arrester has a vertical basket strainer 32 resting on a striker plate 30 to form an annular body having one closed end. The surface of the basket strainer, which forms the circumferential surface of the turbulence arrester, is a thin plate which includes a large number of squared-edged apertures or orifices 33. The apertures must be sufficient in size and number so that fuel flow rates into the tank are not impeded, but should be small and closely spaced together so that flow streams through adjacent apertures will mix and interfere within a short distance from the basket strainer. The combined area of the apertures should exceed the cross-sectional area of the drop tube by several multiples. For example, an arrester with a diameter of 3.45", an effective length of 14", and 0.045" apertures placed on 0.066" straight centers will have in excess of 34,000 apertures. The combined area of these apertures exceeds the cross-sectional area of a 4" diameter drop tube by a factor of over four. This arrangement confines turbulence to a region of approximately two drop tube diameters from the surface of the arrester.

In the presently preferred embodiment, both the basket strainer and the striker plate are formed of carbon steel, with the bottom of the turbulence arrester encapsulated in known epoxy formulated for gasoline immersion. However any material compatible with the stored liquid may be used, including stainless steel or an alloy.

In operation, fuel descending through the drop tube encounters the striker plate 30 and is forced through the circumferential apertures 33. As fuel streams exit each orifice, they experience an area of minimum pressure 40 downstream called the vena contracta, which causes the fuel stream to contract D2. As the exiting fuel stream enters the body of fuel already present in the tank, it undergoes a change in velocity. The difference between the exiting velocity V1 and the velocity downstream V2 is accompanied by a corresponding change in pressure in the fuel stream. The fuel stream therefore expands, generating friction between itself and fuel streams from adjacent apertures. The adjacent fuel streams thus begin to mix and interfere, creating eddies and turbulence. However this turbulence is limited to a narrow region within the tank surrounding the turbulence arrester, and becomes negligible after a short distance, preferably less than two drop tube diameters, from the apertures. Because the turbulence is restricted to a region near the turbulence arrester, contaminants at the bottom of the tank remain undisturbed and therefore are not picked up by the submersible pump and transferred to the filter at the dispenser. Moreover water accumulations near the bottom of the tank will not unnecessarily cause monitors to sound an alarm. The restriction of turbulence to a narrow region also inhibits foaming, reduces vapor generation during the fuel drop, and reduces static build-up associated with the fuel drop.

Many modifications and variations may be made in the embodiments described herein and depicted in the accompanying drawings without departing from the concept of the present invention. Accordingly, it is clearly understood that the embodiments described and depicted herein are illustrative only and are not intended as a limitation upon the scope of the present invention.

I claim:

1. A turbulence arrester for a storage tank drop tube comprising:

a body having an open end for connection to the drop tube;

a closed end; and a wall therebetween, said wall having a plurality of baffleless apertures permitting liquid flow therethrough, said apertures sized and spaced so that turbulence liquid flow through said apertures is confined to a region approximately two drop tube diameters from the wall.

2. The turbulence arrester of claim 1 wherein said aperture has an area, said open end has a cross-sectional area, and the combined area of said apertures exceeds the cross-sectional area of said open end.

3. The turbulence arrester of claim 2 wherein the combined area of said apertures exceeds the cross-sectional area of said open end by a ratio of at least 4:1.

4. The turbulence arrester of claim 1 wherein said body is made of carbon steel.

5. The turbulence arrester of claim 1 further comprising an adapter connecting said open end to said drop tube.

6. A turbulence arrester for a storage tank drop tube comprising:

a striker plate; and a strainer having a first end connected to said drop tube and a second end abutting said striker plate, said strainer including a plurality of apertures permitting liquid flow therethrough, said apertures sized and spaced so that turbulence in liquid flow through said apertures is confined to a region approximately two drop tube diameters from the wall.

7. The turbulence arrester of claim 6 wherein each said aperture has an area, said basket strainer has a cross-sectional area, and the combined area of said apertures exceeds the cross-sectional area of said basket strainer.

8. The turbulence arrester of claim 7 further comprising an adapter connecting said second end to a drop tube.

9. The turbulence arrester of claim 7, wherein each said aperture has an area, said open end has a cross-sectional area and the combined area of said apertures exceeds the cross-sectional area of said open end.

10. The turbulence arrester of claim 9, wherein the combined area of apertures exceeds the cross-sectional area of said open end by a ratio of at least 4:1.

11. The turbulence arrester of claim 10, wherein said body is made of carbon steel.

* * * * *